United States Patent
Pesci da Silva et al.

(10) Patent No.: US 12,506,816 B2
(45) Date of Patent: Dec. 23, 2025

(54) PRIVATE NETWORK DEVICE MANAGEABILITY VIA SMARTPHONE GATEWAY

(71) Applicant: Lenovo (Singapore) Pte. Ltd., Singapore (SG)

(72) Inventors: Mauricio Pesci da Silva, Votorantim (BR); Alan Rodrigues de Almeida, Sorocaba (BR); Davy Alves de Souza, Sorocaba (BR); Bruno Antunes da Silva, Sorocaba (BR); Renan Carlos Pereira, Pirenopolis (BR); Fabio Jung Diegues, Indaiatuba (BR); Giulliano Paes Carnielli, Valinhos (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 117 days.

(21) Appl. No.: 18/296,098

(22) Filed: Apr. 5, 2023

(65) Prior Publication Data
US 2024/0340360 A1    Oct. 10, 2024

(51) Int. Cl.
*H04L 69/16* (2022.01)
*H04L 9/40* (2022.01)
*H04L 12/66* (2006.01)

(52) U.S. Cl.
CPC ............ *H04L 69/162* (2013.01); *H04L 12/66* (2013.01); *H04L 63/0272* (2013.01)

(58) Field of Classification Search
CPC .... H04L 69/162; H04L 12/66; H04L 63/0272
See application file for complete search history.

(56) References Cited

U.S. PATENT DOCUMENTS

| | | | | |
|---|---|---|---|---|
| 2002/0184533 A1* | 12/2002 | Fox | ...................... | H04L 63/1433 709/224 |
| 2007/0086449 A1* | 4/2007 | Huang | .................... | H04L 41/00 370/389 |
| 2014/0344430 A1* | 11/2014 | Ayanam | .............. | H04L 41/0213 709/223 |
| 2016/0014073 A1* | 1/2016 | Reddy | .................... | H04L 47/822 713/2 |
| 2022/0124043 A1* | 4/2022 | Zhu | ...................... | H04L 47/2475 |

* cited by examiner

*Primary Examiner* — Bryan Y Lee
(74) *Attorney, Agent, or Firm* — Schwegman Lundberg & Woessner, P.A.

(57) ABSTRACT

A computer implemented method includes establishing a local connection to a local private network via a gateway device. A connection is established between the gateway device and a management service in a remote network. A private network target device is discovered on the local private network and information identifying the private network device is provided to the management service. Communications are transferred between the management service and the private network target device via the gateway device over the connection.

14 Claims, 4 Drawing Sheets

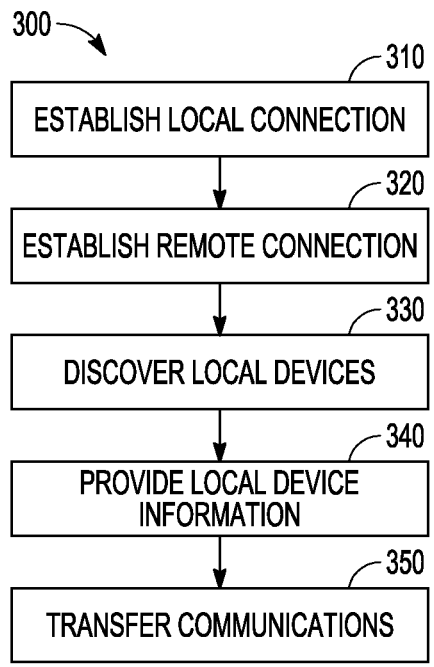
FIG. 3
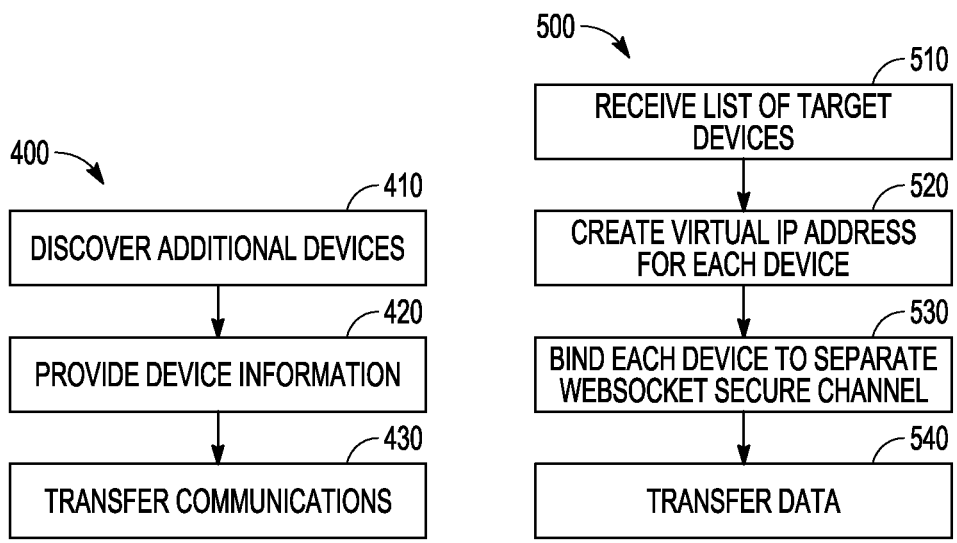
FIG. 4
FIG. 5

PRIVATE NETWORK DEVICE MANAGEABILITY VIA SMARTPHONE GATEWAY

BACKGROUND

Many enterprises today provide central management services for devices in an enterprise network. Such services may only be able to manage devices under the same enterprise network. Devices sitting within private networks are not even visible outside the private networks, making it difficult to manage such devices via central management services without each such device having special hardware. A technician utilizing the central management services will not have the means to reach devices in private networks that may be out of order or otherwise not working correctly.

In the typical off-site scenario, equipment will be in a private network, behind a firewall and with no incoming connection capability. A target machine (the client) must initiate the connection through a gateway server, to which the management server must also be connected, to make communication possible.

One existing management system is implemented in firmware and relies on the availability of specific proprietary technology, which is not helpful when trying to manage devices not having such proprietary technology.

SUMMARY

A computer implemented method includes establishing a local connection to a local private network via a gateway device. A connection is established between the gateway device and a management service in a management service network. A private network target device is discovered on the local private network and information identifying the private network device is provided to the management service. Communications are transferred between the management service and the private network target device via the gateway device over the connection.

BRIEF DESCRIPTION OF THE DRAWINGS

FIG. 3 is a flowchart illustrating a computer implemented method for establishing a connection to devices in a private network according to an example embodiment.

FIG. 4 is a flowchart illustrating a computer implemented method for establishing an additional connection to an additional device in a private network according to an example embodiment.

FIG. 5 is a flowchart illustrating a computer implemented method 500 for creating channels to transfer data to devices in a private network according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A device sitting inside a private network is not visible from outside the private network and cannot be reached by a server on a different network. Providing any kind of management service to a device in the private network may not be feasible, especially if the machine is not working properly.

An improved system for managing target devices in a private network utilizes a gateway device that has access to the private network and to a separate, public network that enables communication with a network such as an enterprise network, private network, or other network. In one example, the gateway device is a mobile device, such as a smart phone having access to a cellular network and, also, to the private network via a WiFi connection. The gateway device enables a management server located in separate network to provide remote management services to the target devices in the private network.

Figure 1:
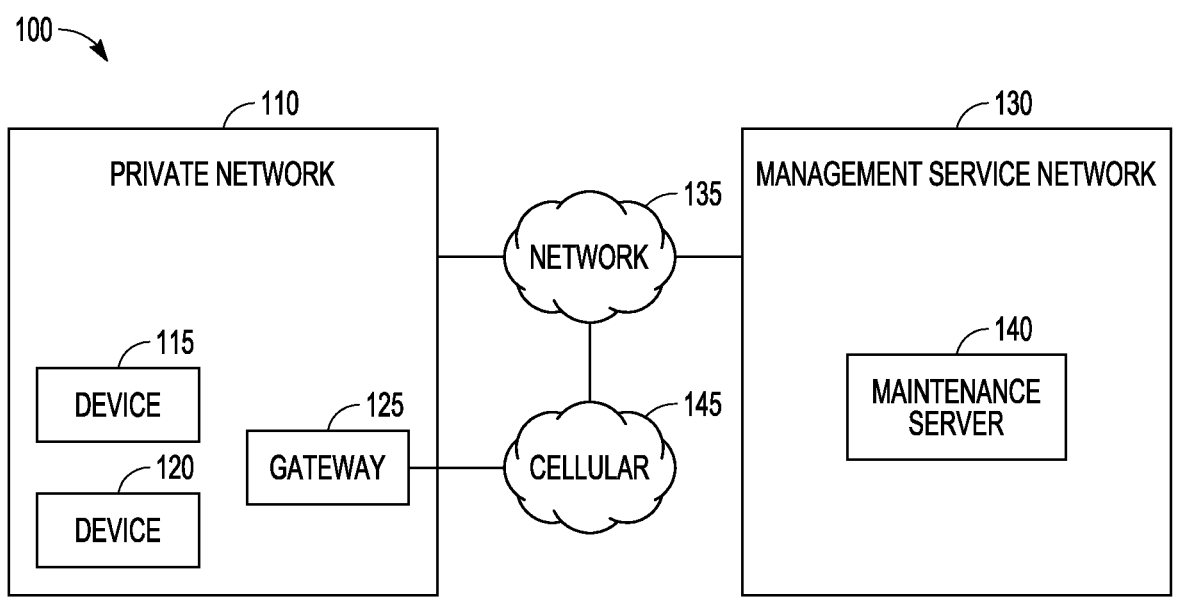
FIG. 1 is a simplified block diagram of a system for managing target devices in a private network according to an example embodiment.

FIG. 1 is a simplified block diagram of a system 100 for managing target devices in a private network. A private network 110 includes multiple devices 115, 120 utilizing the private network via a wired or wireless connection. A gateway device 125 also utilizes the private network via a wireless connection, such as a WiFi connection. The devices 115 and 120 may be devices used by a user of the private network 110. The user may also be associated with a management service network 130. Management service network 130 may be an enterprise network commonly used by corporations, or may be a private network or any other network from which it is desired to manage devices on private network 110.

The user may be an employee that uses the devices 115 and 120 to communicate with the management service network 130 via a public network 135, such as the Internet. The devices 115 and 120 may be used to access email, storage, and other services provided by the management service network 130.

Management service network 130 may desire to manage the devices 115 and 120 in the private network 110, but may not be able to directly communicate with such devices via the public network 135. The gateway device 125 may be used as a proxy in one example to provide the management service network 130 the ability to manage the devices 115 and 120 via a management server 140 on the management service network. The gateway device 125 may be a smart phone in one example that can communicate directly with the management service network 130 via network 135, provided that the private network 110 has a connection to network 135, to transfer communications between the management server 140 and the devices 115 and 120. In a further example, the gateway device may have access to a separate, cellular network 145. The cellular network may couple directly to the management service network 130 or via a network 135.

Figure 2:
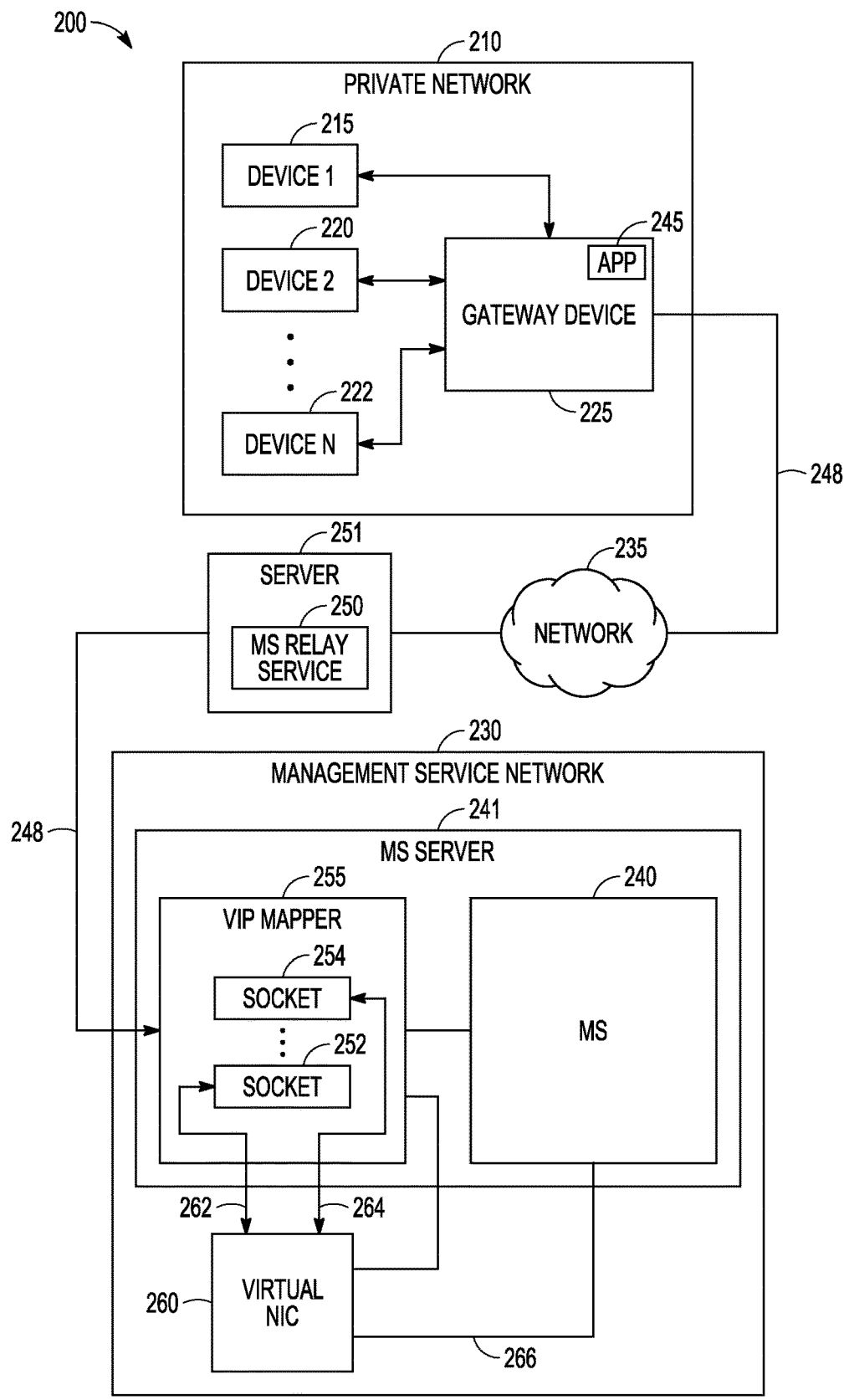
FIG. 2 is a detailed block diagram of a system for managing target devices in a private network according to an example embodiment.

FIG. 2 is a detailed block diagram of a system 200 for managing target devices in a private network. A private network 210 includes multiple target devices 215, 220, 222 utilizing the private network via a wired or wireless connection. A gateway device 225 also utilizes the private network 210 via a wireless connection, such as a WiFi connection. The target devices 215, 220, 222 may be devices used by a user of the private network 210. The user may also be associated with a management service network 230. The user may be an employee that uses the target devices 215, 220, 222 to communicate with the management service network 230 via a public network 235, such as the Internet. The target devices 215, 220, 222 may be used to access email, storage, and other services provided by the management service network 230.

Management service network 230 may desire to manage the target devices 215, 220, 222 in the private network 210, but may not be able to directly communication with such devices via the public network 235. The gateway device 225 may be used as a proxy in one example to provide the management service network 230 the ability to manage the target devices 215, 220, 222 via a management service 240 in a management server 241 on the management service network. Many different management services 240 may be used in various embodiments. One example management service may be built upon the DASH (Desktop and Mobile Architecture for System Hardware) protocol, designed to convey management messages. The gateway device 225 may be a smart phone in one example that has access to a separate, cellular network that also couples to network 235. The network 235 may couple directly to the management service network 230 to transfer communications between the management service 240 and the devices 215 and 220.

The gateway device 225 in one example includes an app 245 capable of both initiating a session with the management service 240 and routing messages to and from the target devices 215, 220, 222. In one example, a WebSocket Secure (WSS) tunnel 248 is created with the management service 240 using a relay service 250 in a server 251. In a further example, a message broker may be used. Server 251 may be a DMZ (demilitarized zone) server that comprises a subnetwork used to expose services of the management service network 230 to untrusted networks, such as the Internet, network 235.

The management server creates a WSS communication channel to the relay service 250 used to receive external devices, target devices 215, 220, 222, to be managed. The app 245, when launched, scans the private network 210 to discover target devices 215, 220, 222 and obtain information identifying the target devices 215, 220, 222. In one example, the app 245 utilizes a discovery process based on a remote management and control protocol (RMCP). The app 245, then sends the discovered private network device information to the management service 240 relay service 250. The relay service 250 creates a WSS channel indicated at sockets 252 and 254 for each private network device and forwards their WSS channel addresses to the management service 240. A virtual IP mapper, VipMapper 255 creates a virtual IP address for each device using a Virtual Network Interface Card (NIC) 260, binding the devices to the respective WSS channel of the Relay Service 250 as indicated at 262 and 264. Requests for these virtual IPs are forwarded to the gateway app 245 through the relay service 250.

Whenever the gateway app 245 receives a request via the WSS tunnel 248, the request is sent to the destination target device 215, 220, 222 and each device response is written back to the same WSS tunnel 248, reaching the management service 240 via relay service 250.

In operation, the management server uses a virtual IP address that was assigned to the virtual NIC 260 via connection 266. The virtual IP address is bound to one of the WSS channels such as channel 262 to socket 252 in Virtual IP mapper 255. Network traffic related to the request is forwarded to the mobile app 245 through relay service 250. The mobile app 245 delivers the traffic via WSS tunnel 248 to the target device 215 associated with the virtual IP address and transfers data from the target device 215 back along the same WSS tunnel 248. The network traffic along WSS tunnel 248 enables direct management of target device 215 by management service 240.

FIG. 3 is a flowchart illustrating a computer implemented method 300 for establishing a connection to devices in a private network. Method 300 begins at operation 310 by establishing a local connection to a local private network via an app on gateway device. In one example, the gateway device is a smart phone coupled to a cellular network. The smart phone operates as a proxy for the private network target device.

Operation 320 establishes a connection between the gateway device and a management service in a separate network such as a remote network. The connection may be referred to as a remote connection in one example. The separate network may be an enterprise server network in one example, The gateway device discovers one or more private network target devices on the local private network at operation 330 and at operation 340 provides information identifying the private network device to the management service.

Discovering a private network target device may include scanning for IP addresses on the private network. Communications are transferred at operation 350 between the management service and the private network target device via the gateway device app over the connection. A relay service may be used to transfer communications between the management service and the private network target device.

In one example, transferring communications includes creating an IP address for the private network target device comprises binding the private network target device to the WSS channel via a virtual network interface card. The virtual network interface card may be coupled to a socket for each WSS channel.

FIG. 4 is a flowchart illustrating a computer implemented method 400 for establishing an additional connection to an additional device in a private network. Method 400 begins at operation 410 by discovering an additional private network target device on the local private network. At operation 420, information identifying the additional private network device is provided to the management service. Communications are transferred at operation 430 between the management service and the additional private network target device via the gateway device app over the connection. In one example, an IP address for the additional private network target device is created to bind the additional private network target device to a WSS channel via a virtual network interface card.

FIG. 5 is a flowchart illustrating a computer implemented method 500 for creating channels to transfer data to devices in a private network. Method 500 begins at operation 510 by receiving a list of target devices in a private network at a device management server in a management service network. Operation 520 creates a virtual IP address for each target device via a virtual network interface card. Operation 530 binds each virtual IP address to a separate WebSocket secure channel coupled to a gateway device connected to the virtual private network. Operation 540 transfers information between the target devices and the device management server via the gateway device to manage the target devices via the separate WebSocket secure channels.

Figure 6:
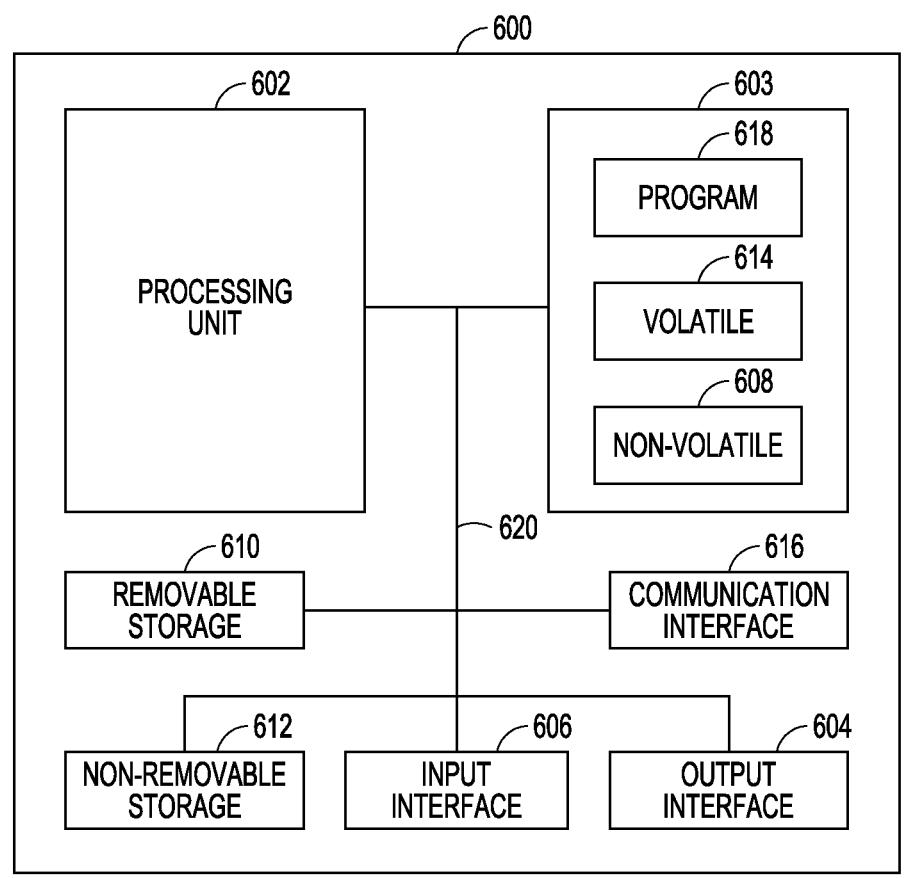
FIG. 6 is a block schematic diagram of a computer system to implement one or more example embodiments.

FIG. 6 is a block schematic diagram of a computer system 600 for use in implementing one or more gateway devices, target devices, servers, and network to allow management of devices in a private network and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

Examples

1. A computer implemented method includes establishing a local connection to a local private network via a gateway device. A connection is established between the gateway device and a management service in a separate network. A private network target device is discovered on the local private network and information identifying the private network device is provided to the management service. Communications are transferred between the management service and the private network target device via the gateway device over the connection.
2. The method of example 1 wherein the gateway device includes a smart phone coupled to a public network.
3. The method of example 2 wherein the smart phone includes an app that operates as a proxy for the private network target device.
4. The method of any of examples 1-3 wherein a relay service is used to transfer communications between the management service and the private network target device.
5. The method of example 4 wherein transferring communications includes creating an IP address for the private network target device and binding the private network target device to a WebSocket secure (WSS) channel via a virtual network interface card.
6. The method of example 5 wherein the virtual network interface card is coupled to a socket.
7. The method of any of examples 5-6 and further including discovering an additional private network target device on the local private network, providing information identifying the additional private network device to the management service, and transferring communications between the management service and the additional private network target device via the gateway device app over an additional connection.
8. The method of any of examples 1-7 wherein establishing a connection includes creating a WebSocket secure (WSS) tunnel for each of the private network target devices.
9 The method of example 8 wherein transferring communications includes creating an IP address for the additional private network target device and binding the additional private network target device to the WSS channel via a virtual network interface card.
10. The method of any of examples 1-9 wherein discovering a private network target device includes scanning for IP addresses on the private network, using the RMCP.
11. A computer implemented method includes receiving a list of target devices in a private network at a device management server in a management service network, creating a virtual IP address for each target device via a virtual network interface card, binding each virtual IP address to a separate WebSocket secure channel coupled to a gateway device connected to the virtual private network.

12. The method of example 11 and further including transferring information between the target devices and the device management server via the gateway device.
13. The method of example 12 and further including managing the target devices via the separate Web-Socket secure channels.
14. A device includes a processor and a memory device coupled to the processor and having a program stored thereon for execution by the processor to perform operations to perform any of the methods of claims 1-13.
15. A machine-readable storage device having instructions for execution by a processor of a machine to cause the processor to perform operations to perform any of the methods of claims 1-13.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. A computer implemented method comprising:
    establishing a local connection to a local private network via a gateway device on the local private network, wherein the gateway device comprises a cellular device;
    establishing a connection between the gateway device and a management service in a remote network via a cellular network;
    discovering, by the gateway device, a private network target client device on the local private network, wherein the private network target client device does not have direct access to athe public network;
    providing information identifying the private network client device, via the gateway device and public network, to the management service in the remote network, wherein the cellular device includes an app that operates as a proxy for the private network target device; and
    transferring communications between the management service and the private network target client device via the gateway device over the public network connection to enable target client device management by the management service.
2. The method of claim 1 wherein a relay service is used to transfer communications between the management service and the private network target device.
3. The method of claim 1 wherein discovering a private network target device comprises scanning for IP addresses on the private network.
4. The method of claim 1 and further comprising:
    discovering an additional private network target device on the local private network;
    providing information identifying the additional private network device to the management service; and
    transferring communications between the management service and the additional private network target device via a gateway device app over an additional connection.
5. The method of claim 4 wherein establishing a connection comprises creating a WebSocket secure (WSS) tunnel for each of the private network target devices.
6. The method of claim 5 wherein transferring communications comprises creating an IP address for the additional private network target device and binding the additional private network target device to the WSS tunnel via a virtual network interface card.
7. A computer implemented method comprising:
    receiving a list of target devices in a private network sent by a gateway device coupled in the private network at a device management server in a management service network connected to the private network via a public network, wherein the gateway device comprises a smart phone coupled to the public network via a cellular network, and wherein the target devices do not have access to the public network;

creating a virtual IP address for each target device via a virtual network interface card;

binding each virtual IP address to a separate WebSocket secure channel coupled to the gateway device in the virtual private network, wherein the smart phone includes an app that operates as a proxy for the private network target device to enable target client device management by the device management server.

8. The method of claim 7 and further comprising transferring information between the target devices and the device management server via the gateway device.

9. The method of claim 8 and further comprising managing the target devices via the separate WebSocket secure channels.

10. A device comprising:
a processor; and
a memory device coupled to the processor and having a program stored thereon for execution by the processor to perform operations comprising:
establishing a local connection to a local private network via a gateway device on the local private network, wherein the gateway device comprises a cellular device;
establishing a connection between the gateway device and a management service in a remote network via a cellular network;
discovering, by the gateway device, a private network target client device on the local private network, wherein the private network target client device does not have direct access to athe public network;

providing information identifying the private network client device, via the gateway device and public network, to the management service in the remote network, wherein the cellular device includes an app that operates as a proxy for the private network target device; and transferring communications between the management service and the private network target client device via the gateway device over the public network connection to enable target client device management by the management service.

11. The device of claim 10 wherein a relay service is used to transfer communications between the management service and the private network target device.

12. The device of claim 10 wherein multiple devices are discovered and athe virtual network interface card is coupled to a different socket for each created IP address.

13. The device of claim 10 and further comprising:
discovering an additional private network target device on the local private network;
providing information identifying the additional private network device to the management service; and
transferring communications between the management service and the additional private network target device via the app on the gateway device over an additional connection.

14. The device of claim 13 wherein establishing an additional connection comprises creating a WebSocket secure (WSS) tunnel for each of the private network target devices.

* * * * *